(12) United States Patent
Hamada et al.

(10) Patent No.: US 12,420,816 B2
(45) Date of Patent: Sep. 23, 2025

(54) CONTROL DEVICE FOR VEHICLE

(71) Applicant: TOYOTA JIDOSHA KABUSHIKI KAISHA, Toyota (JP)

(72) Inventors: Hirotsugu Hamada, Okazaki (JP); Kengo Nagai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/980,358

(22) Filed: Dec. 13, 2024

(65) Prior Publication Data

US 2025/0269863 A1 Aug. 28, 2025

(30) Foreign Application Priority Data

Feb. 22, 2024 (JP) ................................. 2024-025648

(51) Int. Cl.
*B60W 50/08* (2020.01)
*B60W 10/06* (2006.01)
(Continued)

(52) U.S. Cl.
CPC ............ *B60W 50/08* (2013.01); *B60W 10/06* (2013.01); *B60W 10/11* (2013.01); *F02D 9/08* (2013.01); *F16H 61/04* (2013.01); *B60W 2510/02* (2013.01); *B60W 2510/1005* (2013.01); *B60W 2510/1015* (2013.01); *B60W 2540/10* (2013.01); *B60W 2710/0605* (2013.01); *B60W 2710/0666* (2013.01); *B60W 2710/1005* (2013.01); *F16H 2061/0477* (2013.01)

(58) Field of Classification Search
CPC .... F16H 61/04; F16H 2061/0477; F02D 9/08; B60W 50/08; B60W 10/06; B60W 10/11; B60W 2510/02; B60W 2510/1005; B60W 2510/1015; B60W 2540/10; B60W 2710/0605; B60W 2710/0666; B60W 2710/1005
See application file for complete search history.

(56) References Cited

U.S. PATENT DOCUMENTS

| | | | | |
|---|---|---|---|---|
| 5,101,687 A | * | 4/1992 | Iwatsuki | B60W 10/04 |
| | | | | 477/109 |
| 5,876,301 A | * | 3/1999 | Tabata | B60W 10/04 |
| | | | | 477/109 |

(Continued)

FOREIGN PATENT DOCUMENTS

| | | | | |
|---|---|---|---|---|
| JP | 2010-007491 A | | 1/2010 | |
| JP | 2011-196458 A | | 10/2011 | |
| JP | 2016035300 A | * | 3/2016 | ............ F16H 61/04 |

*Primary Examiner* — Tisha D Lewis
(74) *Attorney, Agent, or Firm* — SoraIP, Inc.

(57) ABSTRACT

ECU of the motor vehicle controls the driving condition of the engine and the shift stage of the automatic transmission. ECU controls a determination step of determining whether a downshift occurs in the accelerator-on state during the downshift associated with the accelerator-off, and a torque-up step of increasing the torque based on the operation of the electronic control throttle of the engine when the downshift occurs in the accelerator-on state. In the torque-up step, the first throttle torque request amount in the first period before the start of the inertia phase is made smaller than the second throttle torque request amount in the second period after the start of the inertia phase.

8 Claims, 4 Drawing Sheets

(51) Int. Cl.
*B60W 10/11* (2012.01)
*F02D 9/08* (2006.01)
*F16H 61/04* (2006.01)

(56) References Cited

U.S. PATENT DOCUMENTS

| | | | |
|---|---|---|---|
| 10,442,437 B2* | 10/2019 | Tsukamoto | B60W 30/19 |
| 2007/0049458 A1* | 3/2007 | Ayabe | F16H 63/502 |
| | | | 477/109 |
| 2011/0230308 A1 | 9/2011 | Inoue et al. | |

* cited by examiner

| | | ENGAGEMENT OPERATION TABLE | | | | | |
|---|---|---|---|---|---|---|---|
| | | C1 | C2 | C3 | C4 | B1 | B2 |
| | P | | | | | | |
| | R | | | ○ | | | ○ |
| | N | | | | | | |
| D | 1st | ○ | | | | | ○ |
| | 2nd | ○ | | | | ○ | |
| | 3rd | ○ | | ○ | | | |
| | 4th | ○ | | | ○ | | |
| | 5th | ○ | ○ | | | | |
| | 6th | | ○ | | ○ | | |
| | 7th | | ○ | ○ | | | |
| | 8th | | ○ | | | ○ | |

○: ENGAGEMENT

FIG. 3

CONTROL DEVICE FOR VEHICLE

CROSS-REFERENCE TO RELATED APPLICATION

This application claims priority to Japanese Patent Application No. 2024-025648 filed on Feb. 22, 2024, incorporated herein by reference in its entirety.

BACKGROUND

1. Technical Field

The present disclosure relates to a control device for a vehicle.

2. Description of Related Art

Japanese Unexamined Patent Application Publication No. 2011-196458 (JP 2011-196458 A) discloses a control device for controlling a vehicle drive device including an engine, an electronically controlled throttle (electronic throttle valve), an automatic transmission, a torque converter, a lock-up clutch, and so forth. The control device performs a blipping control to temporarily increase output rotational speed of the engine by the electronic control throttle during power-off downshifting performed manually. Further, the control device engages the lock-up clutch based on a difference between output rotational speed and input rotational speed of the torque converter that decreases after starting the blipping control.

SUMMARY

The present disclosure provides a technology that is capable of reducing shift time when an accelerator is depressed during downshifting when the accelerator is not depressed.

According to an aspect of the present disclosure, there is provided a control device of a vehicle, for controlling a driving state of an engine and a shift stage of an automatic transmission.

The control device controls a determination process of determining whether downshifting will occur in a state in which an accelerator is depressed, due to the accelerator being depressed during execution of downshifting in conjunction with the accelerator not being depressed, and a torque increasing process in which, when determination is made in the determination process that downshifting will occur in the state in which the accelerator is depressed, torque is increased based on operation of an electronic control throttle of the engine before starting of an inertia phase of the automatic transmission and after starting of the inertia phase.

In the torque increasing process, a first throttle torque request amount in a first period before starting of the inertia phase is set to be smaller than a second throttle torque request amount in a second period after starting of the inertia phase.

According to the aspect, the control device of the vehicle can reduce the shift time when the accelerator is depressed during downshifting when the accelerator is not depressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described with reference to the drawings. In the drawings, the same components are denoted by the same reference numerals, and redundant description thereof may be omitted.

Figure 1:
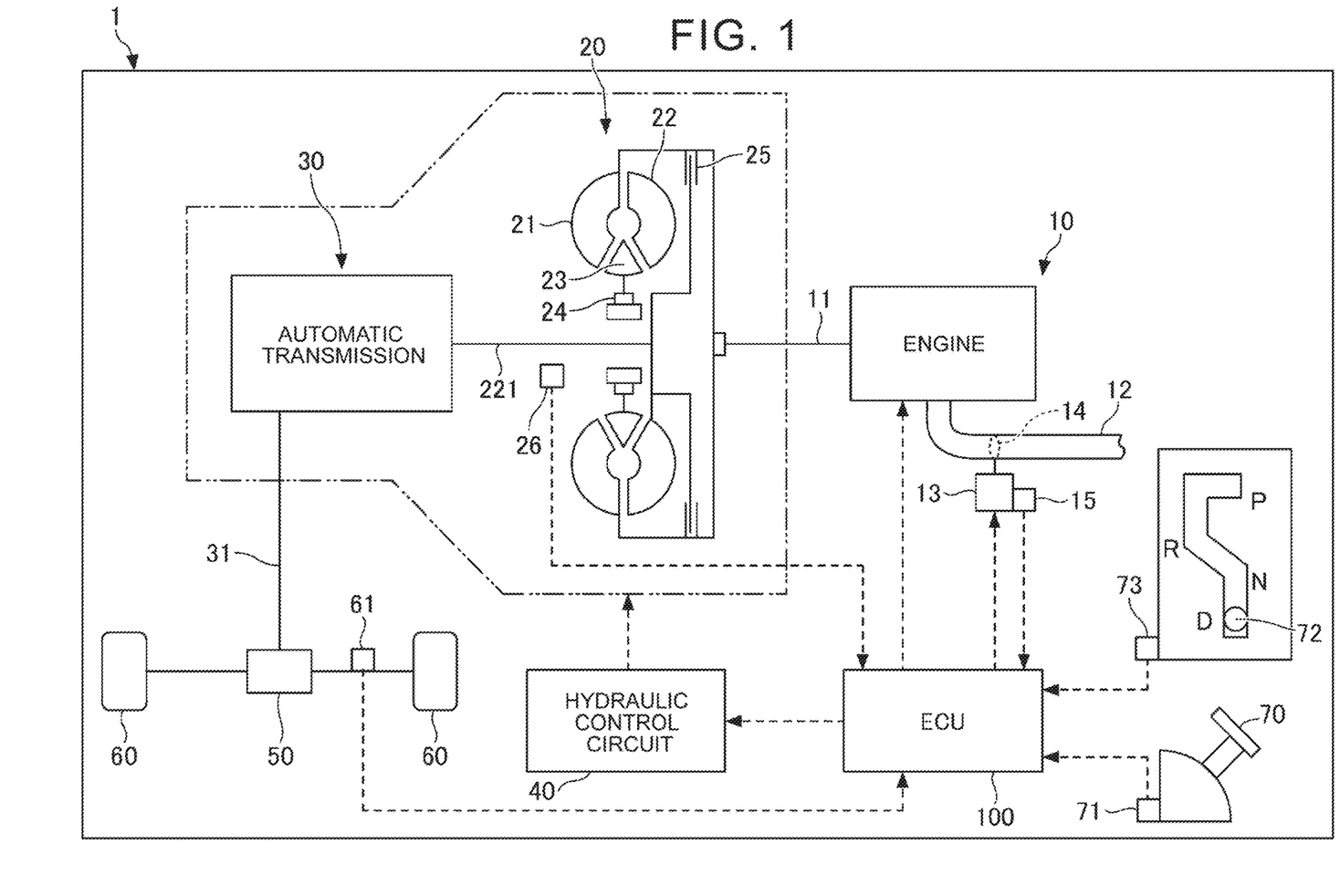
FIG. 1 is a diagram schematically illustrating a vehicle having a control device according to an embodiment and a control system thereof.

FIG. 1 is a diagram schematically illustrating a vehicle 1 having a control device according to an embodiment and a control system thereof. The vehicle 1 includes an engine 10, a torque converter 20, an automatic transmission 30, a hydraulic control circuit 40, and the like as driving devices for traveling. The vehicle 1 transmits the rotation of the output shaft 31 of the automatic transmission 30 to a differential gear device (differential device) 50, and rotates the pair of drive wheels 60 via the differential gear device 50. Further, the vehicle 1 includes an ECU (Electronic Control Unit) 100 as a control device for controlling the driving device for traveling.

The engine 10 is an internal combustion engine that includes a spark plug (not shown) in a cylinder and generates a rotational driving force by combustion of fuel (gasoline) injected into the cylinder. The crankshaft 11, which is an output shaft of the engine 10, is connected to the torque converter 20.

The intake pipe 12 of the engine 10 is provided with an electronic control throttle 13 that operates based on a ECU 100 command (electric signal). The electronic control throttle 13 includes a throttle valve 14 (butterfly valve) that adjusts the intake air quantity of the intake pipe 12 based on the control of ECU 100. The electronic control throttle 13 changes the rotational speed of the engine 10 by feeding air of an intake amount corresponding to the throttle opening degree of the throttle valve 14 to the engine 10. Further, the engine 10 includes a throttle opening degree sensor 15 that detects a throttle opening degree of the throttle valve 14. The throttle opening degree sensor 15 transmits the detected throttle opening degree to ECU 100.

In the engine 10, the rotational driving force increases as the throttle opening degree of the throttle valve 14 increases. ECU 100 basically increases the throttle opening degree as the manipulated variable (accelerator operation amount) of the accelerator pedal 70 by the driver of the vehicle 1 increases. ECU 100 can also change the throttle opening degree regardless of the operation of the accelerator pedal 70 by control.

The accelerator pedal 70 is provided in a floor portion of the vehicle cabin and is depressed by the driver's foot. The accelerator pedal 70 is provided with an accelerator operation amount sensor 71 that detects an accelerator operation amount that is an operation amount of the accelerator pedal 70. The accelerator operation amount sensor 71 transmits the detected accelerator operation amount to ECU 100.

The torque converter 20 is a fluid-type power transmission device that is provided between the engine 10 and the automatic transmission 30 and transmits power via a fluid. The torque converter 20 includes a pump impeller 21 on the input shaft side, a turbine runner 22 on the output shaft side, a stator 23 that amplifies torque, and a one-way clutch 24. The torque converter 20 transmits power between the pump impeller 21 and the turbine runner 22 via a fluid. Further, the torque converter 20 is provided with a lock-up clutch 25 that connects the input shaft side and the output shaft side of the torque converter 20 directly or in a slip state.

The pump impeller 21 is connected to the crankshaft 11 and rotates in the housing of the torque converter 20 as the crankshaft 11 rotates. The turbine runner 22 has a turbine shaft 221 as a center, and rotates the turbine shaft 221 under the action of the rotation of the pump impeller 21 and the stator 23. The turbine rotation speed, which is the rotation speed of the turbine shaft 221, is detected by the turbine rotation speed sensor 26. The turbine rotation speed sensor 26 transmits the detected turbine rotational speed to ECU 100.

The lock-up clutch 25 is a hydraulic friction clutch that is frictionally engaged by controlling the differential pressure between the hydraulic pressure in the engagement-side hydraulic chamber (not shown) and the hydraulic pressure in the release-side hydraulic chamber by the hydraulic control circuit 40. Examples of the operating state of the torque converter 20 include a non-engaged state in which the lock-up clutch 25 is released, a half-engaged state in which the lock-up clutch 25 is engaged with a slip, and an engaged state in which the lock-up clutch 25 is completely engaged. For example, in the engaged state of the lock-up clutch 25, the pump impeller 21 and the turbine runner 22 rotate integrally, so that the rotational driving force of the engine 10 is transmitted to the automatic transmission 30.

The automatic transmission 30 is configured in a stepped type (in other words, a configuration that is not an unauthorized transmission such as a CVT) having a plurality of predetermined shift stages. The automatic transmission 30 has a plurality of hydraulic friction engagement elements and a planetary gearing. The automatic transmission 30 selectively establishes a plurality of shift stages by selectively engaging a plurality of friction engagement elements. The input shaft (not shown) of the automatic transmission 30 is connected to the turbine shaft 221 of the torque converter 20, while the output shaft 31 of the automatic transmission 30 is connected to the differential gear device 50.

The automatic transmission 30 switches the engagement of the frictional engagement element based on the operation of the shift lever 72 by the driver. For example, the shift lever 72 has four shift lever operating positions: parking "P", backward "R", neutral "N", and forward "D". Either of the shift lever operating positions is selected by manual operation of the shift lever 72 by the driver. The shift lever 72, the shift position sensor 73 for detecting the operating position is provided. The shift position sensor 73 transmits information of the shift lever operating position selected by the driver to ECU 100.

Figure 2:
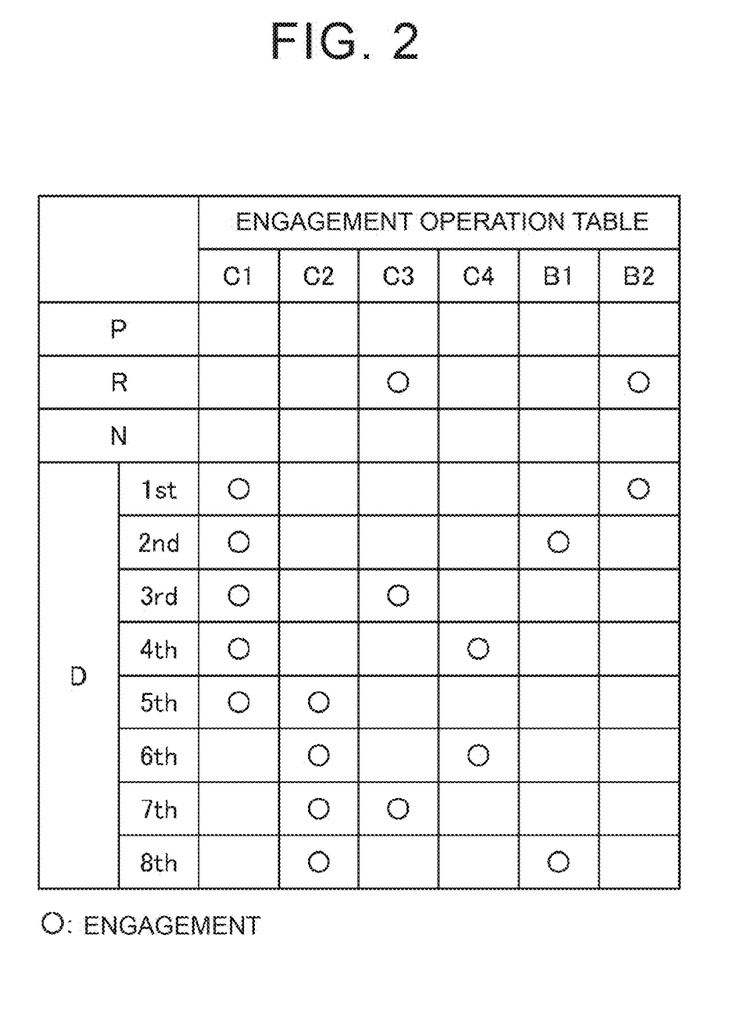
FIG. 2 is a table showing the relationship between the shift lever operating position of the automatic transmission and the combination of actuation of the hydraulic friction engagement element.

FIG. 2 is a table showing the relationship between the shift lever operating position of the automatic transmission 30 and the combination of the actuation of the hydraulic friction engagement element. In FIG. 2, "o" represents an engagement state and "blank" represents a release state.

Automatic transmission 30 comprises, for example, four clutches C1 to C4 as frictional engagement elements and two brakes B1, B2.

The clutches C1 to C4 have a hydraulic servo constituted by a piston, a plurality of friction engagement plates (friction plates and separator plates), an oil chamber (an engagement-side oil chamber and a cancellation oil chamber) to which hydraulic oil is supplied, a return spring, a sealing member, and the like. From the clutches C1 to C4 is configured as a friction-type hydraulic clutch which engages two rotating systems with each other by a hydraulic servo and releases the engagement of the two. The brakes B1, B2 also include hydraulic servos. The hydraulic servo includes a piston, a plurality of friction engagement plates (friction plates and separator plates), an oil chamber (an engagement-side oil chamber and a cancellation oil chamber) to which hydraulic oil is supplied, a return spring, a seal member, and the like. The brakes B1, B2 are each configured as a frictional hydraulic brake that non-rotatably secures (engages) the rotary system to the stationary system and releases its securement.

ECU 100 switches engagement and disengagement of clutches C1 to C4 and the brakes B1, B2 by controlling the hydraulic control valve in the hydraulic control circuit 40 based on the information on the shift lever operating position of the shift lever 72. When the parking "P" is selected at the shift lever operating position, ECU 100 switches the shift range to the parking range. In this case, ECU 100 is in a neutral state in which the power transmission in the automatic transmission 30 is interrupted, and the rotation of the output shaft 31 of the automatic transmission 30 is mechanically prevented by a mechanical parking mechanism (not shown). When the backward movement "R" is selected at the shift lever operating position, ECU 100 switches the shift range to the backward travel range. In this embodiment, ECU 100 engages the clutch C3 and the brake B2, thereby reversely rotating the rotational direction of the output shaft 31. When the neutral "N" is selected at the shift lever operating position, ECU 100 switches the shift range to the neutral range. Then, ECU 100 shuts off the power transmission in the automatic transmission 30. When the forward travel "D" is selected at the shift lever operating position, ECU 100 switches the shift range to the forward travel range. Here, ECU 100 executes automatic shift control for automatically switching a plurality of forward shift stages by using the clutches C1 to C4 and brakes B1, B2 of the automatic transmission 30. In particular, in the forward travel range, ECU 100 controls engagement and disengagement of the clutches C1 to C4 and the brakes B1, B2 so that any one shift stage of the plurality of forward stages (eight stages in FIG. 2) is established in accordance with the accelerator operation amount of the accelerator pedal, the vehicle speed, and the like.

The hydraulic control circuit 40 is connected to the torque converter 20 (including the lock-up clutch 25), the automatic transmission 30, and the like using a mechanical oil pump (not shown) driven by the engine 10 as a hydraulic supply source. ECU 100 outputs a hydraulic command to the hydraulic control circuit 40. ECU 100 supplies appropriate hydraulic pressure from the hydraulic control circuit 40 to the torque converter 20, the lock-up clutch 25, and the clutches C1 to C4 and the brakes B1, B2 of the automatic transmission 30, and the like. Thus, ECU 100 controls the respective drives. For example, when switching the shift stages of the forward travel range, ECU 100 causes the hydraulic control circuit 40 to supply the hydraulic pressure to a target clutch and a target brake among the clutches C1 to C4 and the brake of the brakes B1, B2. Thus, ECU 100 switches from the present shift stage to the target shift stage.

Further, the vehicle 1 includes a vehicle speed sensor 61 that detects the rotational speed of the drive wheels 60 (in other words, the speed of the vehicle 1) on a shaft that connects the differential gear device 50 and the drive wheels 60. The vehicle speed sensor 61 transmits the detected vehicle speed to ECU 100.

ECU 100 is a computer (ECU: Electronic Control Unit) having a processor, a memory, an input/output interface, a communication interface, and the like (not shown). The processor is an electronic circuit that combines one or more of CPU (Central Processing Unit), GPU (Graphics Processing Unit), ASIC (Application Specific Integrated Circuit), FPGA (Field-Programmable Gate Array), and a circuit including a plurality of discrete semiconductors. The memory includes a main storage device including semiconductor memories such as RAM (Random Access Memory) and ROM (Read Only Memory), and an auxiliary storage device including disks, semiconductor memories (flash memories), and the like. The processor reads the program stored in the memory and performs a process, whereby ECU 100 executes various controls of the driving device for traveling.

Various types of signals are inputted to ECU 100 from sensors provided in respective parts of the vehicle 1. For example, ECU 100 acquires the throttle opening degree of the electronic control throttle 13 detected by the throttle opening degree sensor 15. Further, ECU 100 acquires information on the turbine rotational speed detected by the turbine rotation speed sensor 26 and information on the vehicle speed detected by the vehicle speed sensor 61. Further, ECU 100 acquires information on the accelerator operation amount detected by the accelerator operation amount sensor 71, information on the shift lever operating position detected by the shift position sensor 73, and the like.

Further, ECU 100 outputs a signal for controlling various devices of the vehicle 1. For example, ECU 100 controls the driving status of the engine 10 by outputting a throttle signal for controlling the opening and closing of the electronic control throttle 13, an ignition control signal for controlling the ignition timing of the spark plug of the engine 10, and the like. Further, ECU 100 outputs a signal or the like for driving the solenoid valve in the hydraulic control circuit 40 to the hydraulic control circuit 40 as a command signal for the shift control of the automatic transmission 30 and the lock-up clutch 25.

Then, ECU 100 executes the forward traveling range when the shift lever operating position is positioned at the forward movement "D", and performs the automatic shift control for automatically switching the plurality of shift stages in the forward movement direction based on the traveling state of the vehicle 1 and the driving state of the driver. For example, ECU 100 refers to the automatic transmission map stored in the memory, and determines the shift stage of the automatic transmission 30 based on the throttle opening degree (or accelerator operation amount) and the vehicle speed (or turbine rotation speed). Further, ECU 100 controls the hydraulic control circuit 40 so that the determined shift stage is established, and switches the engagement status of the clutches C1 to C4 and the brakes B1, B2 of the automatic transmission 30.

ECU 100 also controls the engagement of the lock-up clutch 25 based on the driving condition of the vehicles. For example, ECU 100 previously stores a lock-up clutch engagement map (not shown) in the memory. The lock-up clutch engagement map associates the torque converter region, the lock-up slip region, and the lock-up region with the throttle opening (or accelerator operation amount) and the vehicle speed. The torque converter region is in a disengaged state of the lock-up clutch 25. The lock-up slip region is a half-engaged state of the lock-up clutch 25. The lock-up region is in an engaged state of the lock-up clutch 25. ECU 100 reads the lock-up clutch engagement map, determines one of the non-engagement control, the half-engagement control, and the engagement control based on the throttle opening degree and the vehicle speed, and outputs a signal corresponding to the determination to the hydraulic control circuit 40. Thus, the hydraulic control circuit 40 can appropriately control the state of the lock-up clutch 25.

In the vehicle 1 configured as described above, the driver moves the vehicle 1 forward by positioning the shift lever 72 at the shift lever operating position of the forward movement "D". In the control of the forward travel range, ECU 100 automatically switches the shift stage of the automatic transmission 30 on the basis of the throttle opening degree (or the accelerator operation amount), the vehicle speed (or the turbine rotation speed), and the like, thereby causing the vehicle to travel at an appropriate shift stage.

For example, ECU 100 gradually decelerates the vehicle speed by performing coast travel while the driver is not depressing the accelerator pedal 70. In addition, ECU 100 decelerates the vehicle speed in a shorter time than the coast travel by performing the braking travel while the driver presses on a brake pedal (not shown). Then, ECU 100 automatically lowers (downshifts) the shift stage of the automatic transmission 30 based on the vehicle speed, the turbine rotational speed, or the like when decelerating by coast running or braking running.

Incidentally, in the vehicle 1, when the accelerator pedal 70 is depressed by the driver in an accelerator-off state such as coast running or braking running, the vehicle speed is increased when the accelerator is turned on. However, at the timing at which the automatic transmission 30 performs the downshift, the vehicle speed is accelerated (re-acceleration including the upshift) after the control associated with the downshift is temporarily continued in consideration of the hysteresis. Therefore, the driver may feel that the response of the driving operation of the vehicle 1 is poor by continuing the downshift even at the timing when the accelerator pedal 70 is depressed. However, even when the torque of the engine 10 is suddenly increased in response to the operation of the accelerator pedal 70, there is a possibility that a mechanical shock (rattling) of the driving device for traveling may occur.

During the downshift due to the accelerator-off state, the accelerator pedal 70 may be turned on (accelerator-on state) by the driver. ECU 100 in accordance with the embodiments adjusts the torque required by the engine 10 to achieve mechanical shocks and shorter shifting times. Specifically, ECU 100 varies the torque of the engine 10 regardless of the accelerator operation amount operated by the driver before the start of the inertia phase and after the start of the inertia phase in the downshift of the automatic transmission 30. The accelerator operation amount operated by the driver is, in other words, a driver required torque.

Figure 3:
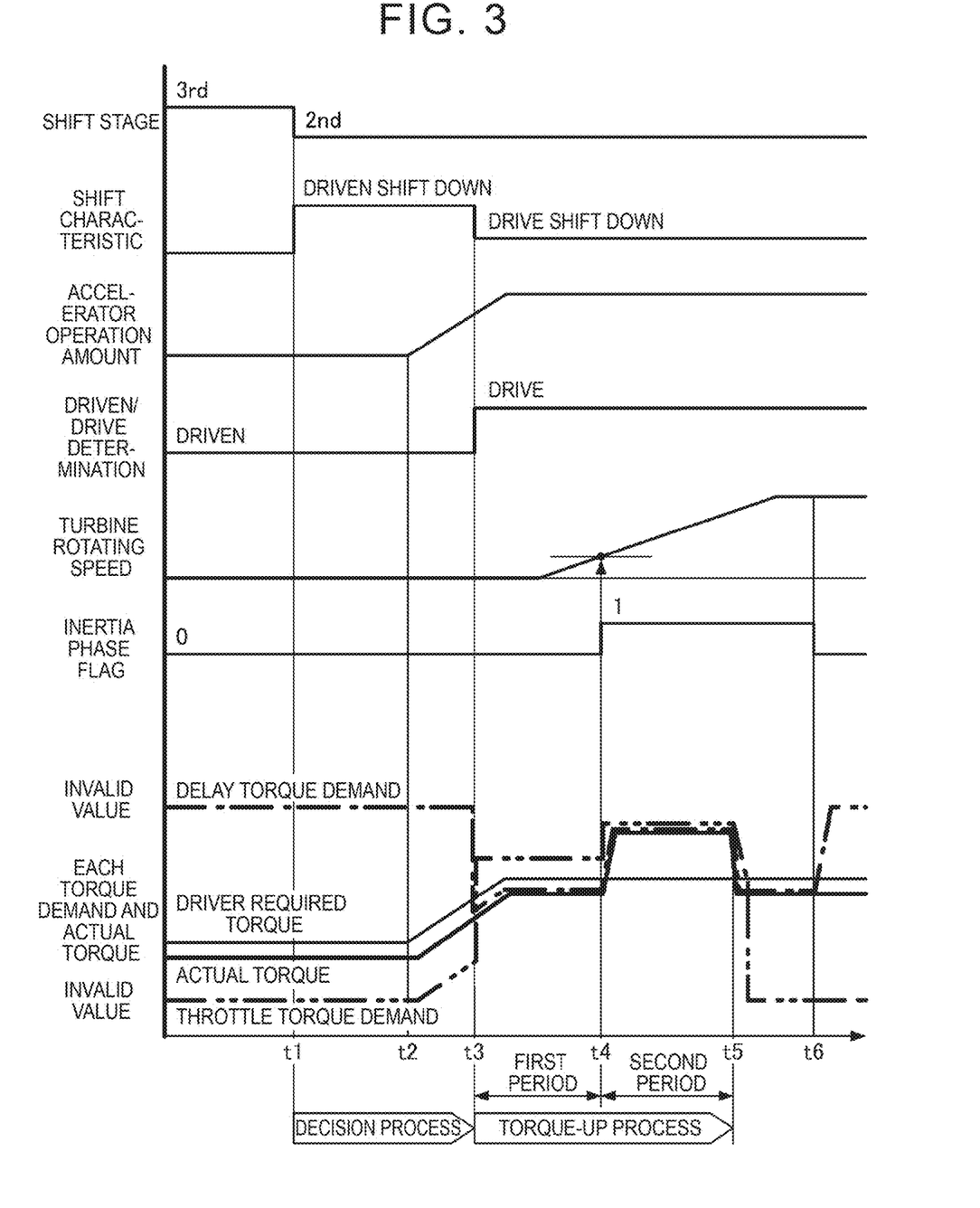
FIG. 3 is a time chart showing a change in torque when the accelerator pedal is turned on in the downshift of the automatic transmission.

Hereinafter, this control will be described in more detail with reference to the time chart of FIG. 3. FIG. 3 is a time chart showing a change in torque when the accelerator pedal is turned on in the downshift of the automatic transmission 30. Note that although FIG. 3 shows an example in which the automatic transmission is downshifted from 3rd to 2nd, the same operation can be performed even when the automatic transmission is downshifted from another shift stage.

ECU 100 acquires the vehicle speed of the vehicle speed sensor 61 and/or the turbine rotation speed of the turbine rotation speed sensor 26 during the coast running or the braking running, and determines whether or not to perform the shift-down of the shift stage of the automatic transmission 30. ECU 100 determines to downshift the shift stage from 3rd to 2nd, e.g., at time t1 in FIG. 3.

In addition, ECU 100 manages a shift-down state as a shift characteristic. For example, the shift characteristic includes a state of a driven downshift, which is a downshift in the accelerator off when the accelerator pedal 70 is not depressed. Further, as the shift characteristic, a state of a drive downshift, which is a downshift in the accelerator on which the accelerator pedal 70 is depressed, is cited. That is, ECU 100 recognizes the driven downshift, which is a downshift of the accelerator-off at the time point t1, and manages the shift characteristic. ECU 100 drives the engine 10 in a state in which no retard is generated in the ignition timing of the engine 10 and in a state in which the supply air quantity of the electronic control throttle 13 is also substantially constant after the time point t1 is started. A state in which a retard is not generated in the ignition timing of the engine 10 corresponds to a state in which the torque down becomes an invalid value. A state in which the amount of air supplied to the electronic control throttle 13 is also substantially constant corresponds to a state in which the torque increase becomes an invalid value.

Further, ECU 100 performs a determination step of determining whether the accelerator is turned on by the driver depressing the accelerator pedal 70 in the driven downshift. For example, at the time point t2 of FIG. 3, which is performing the downshift of the automatic transmission 30, ECU 100 obtains that the accelerator is turned on by the driver. In other words, ECU 100 recognizes that the accelerator is on by receiving a signal in which the accelerator operation amount gradually increases from the accelerator operation amount sensor 71 as information of the accelerator operation amount. At this timing, ECU 100 increases the driver required torque required by the driver to the engine 10 based on the accelerator operation amount. Therefore, ECU 100 increases the throttle torque demand amount of the electronic control throttle 13 in accordance with the driver demand torque, and the engine 10 increases the actual torque in proportion to the increase in the intake air amount. However, since the driver required torque in the vicinity of the time point t2 is small, the throttle torque required by the electronic control throttle 13 is also small.

At a time point t3 when the accelerator operation amount is increased to some extent, ECU 100 determines that the accelerator is turned on in the downshift, in other words, that the accelerator is switched from the driven downshift to the drive downshift. That is, at this timing, ECU 100 switches the managed shift characteristic from the driven downshift to the drive downshift (accelerator-on downshift).

ECU 100 adjusts the required torque amounts required for driving the engine 10 in accordance with the switching from the driven downshift to the drive downshift. Specifically, at the time point t3, ECU 100 requests a torque-down of a retard angle that delays the ignition timing of the engine 10. Hereafter, the amount of the torque requirement for the torque slow angle of the tightening is referred to as the slow angle of the torque requirement. The retard torque required amount is a torque amount required when ECU 100 transmits a command for the ignition timing to the engine 10, and can be converted into a retard of the ignition timing. The retard torque request amount is set according to the mechanical structure of the engine 10, the torque converter 20, and the automatic transmission 30. For example, ECU 100 includes map data indicating a relation between a velocity change indicating a possibility that the torque converter 20 and the automatic transmission 30 may cause a backlash in the mechanical configuration and a retard torque requirement in accordance with a change in the actual torque of the engine 10. ECU 100 sets a required amount of retard torque based on the map data when the retard torque is decreased.

The retard torque request amount is, for example, a value that can control the actual torque of the engine 10 even if the ignition timing of the engine 10 is delayed, and does not cause mechanical shock (rattling) in the engine 10, the torque converter 20, and the automatic transmission 30. Further, ECU 100, for the slow angle torque requirement, is gradually increased after the lowest at the time t3, is varied to be constant at a predetermined amount. As a result, ECU 100 can control the actual torque of the engine 10 appropriately by gradually advancing the retard angle in accordance with the actual torque in the transitional period in which the ignition timing of the engine 10 is delayed.

At time t3, ECU 100 starts a torque-up process of increasing the torque of the electronic control throttle 13. Hereinafter, the torque demand amount of the electronic control throttle 13 is referred to as a throttle torque demand amount. The throttle torque demand amount is a torque amount required when ECU 100 transmits a throttle opening degree command to the electronic control throttle 13, and can be converted into an intake amount of the throttle valve 14.

The throttle torque required amount is preferably set to a limit value (misfire limit value) at which the torque becomes the highest without causing misfire in the engine 10 in which the ignition timing is delayed due to the retard angle. That is, when the ignition timing of the engine 10 is delayed due to the retard angle and the intake air amount from the electronic control throttle 13 is increased, the possibility of misfire is increased. On the other hand, ECU 100 sets the throttle torque requirement to a misfire limit value that does not cause misfire, so that the torque of the electronic control throttle 13 can be sufficiently increased without causing misfire of the engine 10.

ECU 100 is larger than the torque amount associated with the driver required torque with respect to the throttle torque required amount. For example, even if the driver required torque is 40N torque amount, ECU 100 sets the throttle torque required amount to 80N or the like. As described above, by making the throttle torque request amount larger than the driver request torque, the torque amount increased by the electronic control throttle 13 can be sufficiently increased. That is, an increase in the throttle torque demand amount causes the engine 10 to increase the intake air amount from the electronic control throttle 13, so that the actual torque tends to increase.

However, in the torque-up step, the first throttle torque request amount in the first period before the start of the inertia phase of the automatic transmission 30 is made smaller than the second throttle torque request amount in the second period after the start of the inertia phase. As a result, in the first period, the actual torque of the engine 10 is shifted by the torque corresponding to the retard torque required amount. Even if the ignition timing is delayed in accordance with the retard torque required amount in the first period, the engine 10 can preliminarily increase the torque on the electronic control throttle 13 side while avoiding misfire by the set throttle torque required amount.

After the time point t1, the automatic transmission 30 gradually switches the shift stage from 3rd to 2nd based on the supply of the hydraulic pressure from the hydraulic control circuit 40. The automatic transmission 30 continues to switch the shift stage even if the shift is switched from the driven downshift to the drive downshift at the time point t3. For example, during the period from t1 point to t4 point in time at which the shift stage of the automatic transmission 30 is switched, the release clutch (3rd) is in the torque phase mainly receiving the driving force of the engine 10 (the turbine shaft 221 of the torque converter 20). On the other hand, in the switching of the shift stage of the automatic transmission 30, the engagement clutch (2nd) is in the inertia phase mainly receiving the driving force of the engine 10 from the time point t4 to the time point t6. The automatic transmission 30 gradually increases the engagement on the engagement clutch side by the hydraulic pressure from the hydraulic control circuit 40, thereby alleviating the mechanical shock of the shift stage switching.

That is, the time point t4 is a time point at which the torque phase and the inertia phase are switched. ECU 100 recognizes the torque phase and the inertia phase based on the turbine rotation speed (rotation speed) of the turbine shaft 221 as the status quantity of the automatic transmission 30. For example, ECU 100 determines whether the inertia phase is to be executed (started) or not by raising the inertia phase flag (from 0 to 1) based on the turbine rotation speed of the turbine rotation speed sensor 26.

ECU 100 performs a torque-up process of the electronic control throttle 13 as the drive downshift starts. However, ECU 100 performs the above-described torque-down of the retard angle in the first period (from the time point t3 to the time point t4) up to the beginning of the inertia phase even when the torque-up process is started. In other words, in the first interval, ECU 100 outputs a reduced delay torque requirement to retard the engine 10. Further, ECU 100 generates a first throttle torque demand that is increased to such an extent that the engine 10 does not misfire, and thus the actual torque of the engine 10 is likely to increase. The vehicle 1 can smoothly increase the actual torque of the engine 10 after starting the inertia phase while suppressing the mechanical shock of the driving device for traveling by the retard torque request amount and the first throttle torque request amount.

Then, when the inertia phase flag rises at the time point t4, ECU 100 terminates the torque-down of the retard angle of the engine 10. Also, ECU 100 increases the throttle torque demand of the electronic control throttle 13 from the first throttle torque demand to the second throttle torque demand at the time point t4. The second throttle torque requirement is greater than the first throttle torque requirement. However, since the throttle torque requirement is increased by the time point t4, the amount of torque increase of the engine 10 during the second time period is reduced.

In the second period after the start of the inertia phase, the engine 10 can smoothly increase the actual torque by advancing (returning) the ignition timing and increasing the throttle torque demand amount of the electronic control throttle 13. That is, the actual torque of the engine 10 has risen to the misfire limit of the engine 10 according to the retard torque request amount and the first throttle torque request amount, and rises in a short time from the time point t4 to the second throttle torque request amount. As a result, the automatic transmission 30 can significantly shorten the period required for the inertia phase in the downshift.

Further, ECU 100, at the time point t5 prior to termination of the inertia phase, performs torque down of the slow angle, performs torque down of the electronic control throttle 13. At this point in t5 phase, the inertia phase of the downshift is over. At this stage, the actual torque of the engine 10 becomes a torque that has decreased in a short time in accordance with the required amount of the retard torque in the torque-down of the retard angle, and thus the mechanical shock immediately after the shift stage of the automatic transmission 30 is switched can be alleviated.

Then, the automatic transmission 30 ends the downshift at the time point t6. ECU 100 can smoothly drive 2nd by returning the retard angle of the engine 10 to the original position at the time of finishing the downshift. In particular, when the speed is higher than the accelerator-on of the driver, the speed is smoothly increased after the time point t6, and for example, the shift from the downshift to the upshift can be performed in a short time.

Figure 4:
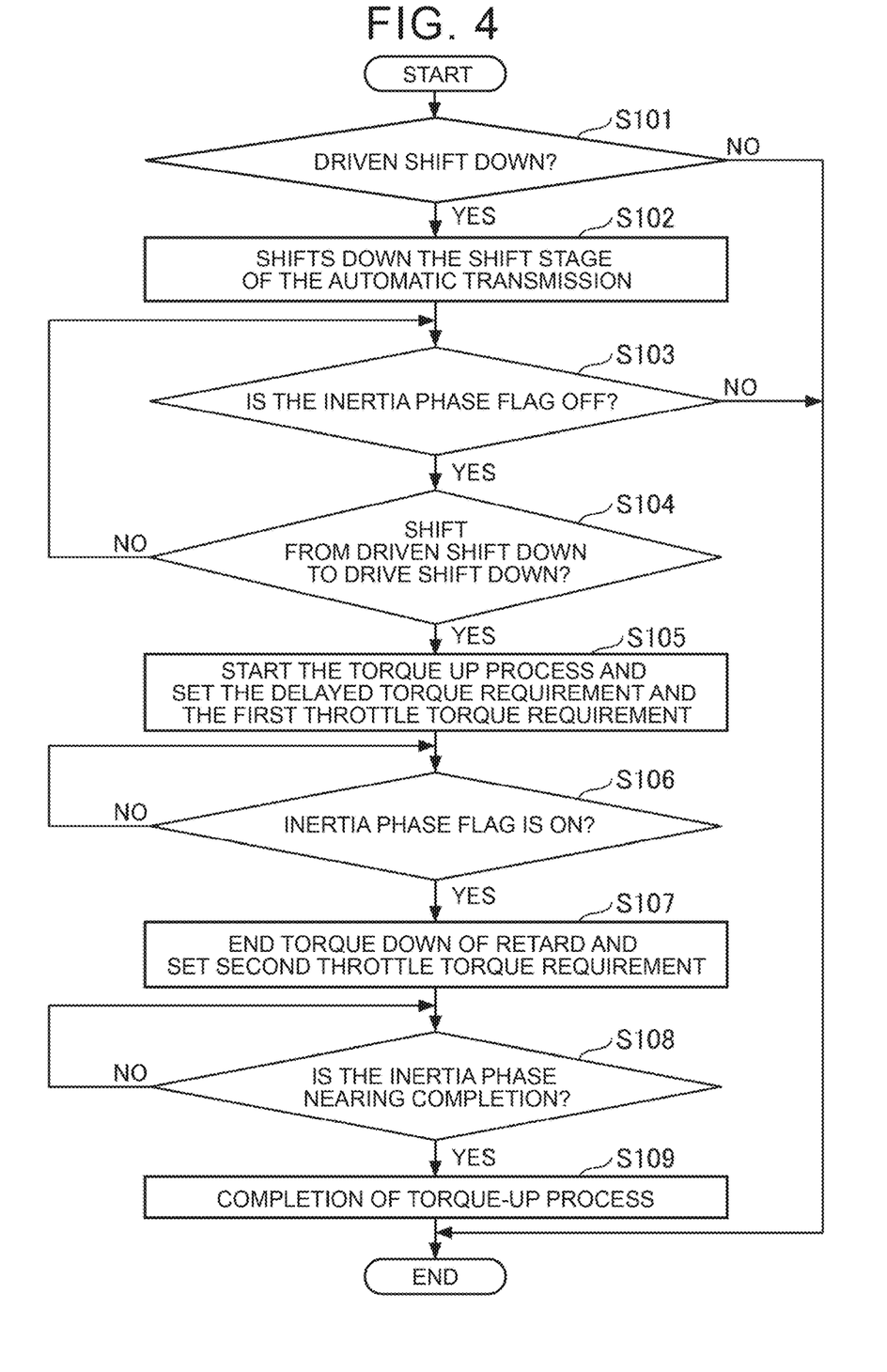
FIG. 4 is a flowchart illustrating a process performed when an accelerator is turned on during a downshift in the accelerator-off state.

The control device (ECU 100) of the vehicle 1 according to the embodiment is basically configured as described above, and the process flow thereof will be described below referring to FIG. 4. FIG. 4 is a flowchart illustrating a process performed when an accelerator is turned on during a downshift in the accelerator-off state.

ECU 100 automatically downshifts the automatic transmission 30 during coast running or braking running by accelerator-off. At this time, ECU 100 determines whether the driven shift-down is performed on the basis of the accelerator operation amount of the accelerator operation amount sensor 71 (S101). If the accelerator operation amount continues at 0° (accelerator off), ECU 100 proceeds to S102 with the shift response as a driven downshift (S101: YES). On the other hand, if the accelerator is turned on prior to the downshift (S101: NO), the process proceeds to the process of raising the vehicle speed based on the accelerator operation amount, so that the downshift is not performed in the first place. Therefore, ECU 100 ends the process.

In S102, ECU 100 starts the driven downshift and shifts to an operation of lowering (downshifting) the shift stage of the automatic transmission 30. In this case, the automatic transmission 30 gradually weakens the engagement on the release clutch side while executing the torque phase in which the rotational driving force is mainly transmitted by the release clutch side.

While the driven downshift is being performed, ECU 100 monitors the inertia phase flag of the automatic transmission 30 to determine whether the inertia phase flag is off (S103). The state in which the inertia phase flag is turned on is a state in which the rotational driving force is mainly transmitted by the engagement clutch side in the driven downshift. Even if the accelerator pedal 70 is depressed by the driver after the start of the inertia phase, the effect of the torque increase on the electronic control throttle 13 side is small. For this reason, ECU 100 ends this process flow without performing the torque-up process of the electronic control throttle 13 after the inertia phase starting flag is turned on (S103: NO). On the other hand, when the starting flag of the inertia phase is off (S103: YES), ECU 100 proceeds to S104.

In S104, ECU 100 monitors the accelerator operation amount and determines whether or not the driver has shifted from the driven downshift to the drive downshift by depressing the accelerator pedal 70. When the accelerator pedal 70 is not depressed (S104: NO), ECU 100 returns to S103 and repeats the same process. On the other hand, when the accelerator pedal 70 is depressed (S104: YES), ECU 100 proceeds to S105.

In S105, ECU 100 performs a torque-down process of the retard angle and a torque-up process of the electronic control throttle 13. That is, ECU 100 outputs the retard torque requirement to the engine 10 and outputs the first throttle torque requirement to the electronic control throttle 13. The engine 10 delays the ignition timing of the engine 10 based on the retard torque required amount. As a result, mechanical shock (rattling) of the driving device for traveling is suppressed. Further, the automatic transmission 30 outputs the first throttle torque requirement to the electronic control throttle 13 in order to ensure the responsiveness of the electronic control throttle 13 in the inertia phase. Accordingly, the vehicle 1 can increase the torque of the electronic control throttle 13 while suppressing misfire in the first period before the start of the inertia phase of the automatic transmission 30.

Then, ECU 100 monitors the inertia phase flag of the automatic transmission 30 and determines whether the inertia phase flag has risen (S106). ECU 100 continues this monitoring when the inertia phase flag is off (S106: NO), while proceeds to S107 when the inertia phase flag is on (S106: YES).

Upon initiation of the inertia phase, ECU 100 terminates the output of the retard torque requirement while outputting a further torque up (second throttle torque requirement) of the electronic control throttle 13 (S107). Accordingly, the vehicle 1 can increase the actual torque of the engine 10 in a short time during the execution of the inertia phase in the downshift of the automatic transmission 30. As a result, the entire inertia phase and thus the entire downshift period can be shortened.

During the execution of the inertia phase, ECU 100 determines whether the inertia phase is near termination (S108). ECU 100, if the inertia phase is not near end (S108: NO), while continuing this monitoring while continuing the inertia phase, when the inertia phase is near end (S108: YES), proceeds to S109.

In S109, ECU 100 ends the torque-up process of the electronic control throttle 13 (zeroing the throttle torque requirement), thereby reducing the actual torque of the engine 10 that has risen in the inertia phase. At this time, ECU 100 retards the engine 10 to reduce the torque, thereby reducing the actual torque of the engine 10. As a result, the vehicle 1 can smoothly perform the next processing at the end of the shift-down.

As described above, the control device (ECU 100) according to the embodiment appropriately adjusts the torque of the engine 10 in accordance with the condition of the automatic transmission 30 when the accelerator is turned on during the downshift in the accelerator off. As a result, the vehicle 1 can reduce the mechanical shock of the driving device for traveling and reduce the shift time of the automatic transmission 30, thereby reducing the hedge. In particular, in the case where the gear ratio difference (synchronous rotation difference) of the shift stage is large in the automatic transmission 30, the shift time required for the shift-down tends to be long, but the vehicle 1 can shorten the shift time as much as possible by performing the above processing.

Note that the control device (ECU 100) of the vehicle 1 according to the present disclosure is not limited to the above-described embodiment, and various modifications can be adopted. For example, ECU 100 according to the embodiment is configured not to perform the torque-up process of the electronic control throttle 13 when the accelerator is turned on after the inertia phase is started. However, ECU 100 may be configured to perform the torque-up process of the electronic control throttle 13 even when the accelerator is turned on after the inertia phase is started.

The technical idea and effects of the present disclosure described in the above embodiments will be described below.

An aspect of the present disclosure is a control device (ECU 100) of the vehicle 1 that controls a driving condition of the engine 10 and a shift stage of the automatic transmission 30, and controls a determination process and a torque-up process. The determination step is a step of determining whether the accelerator is shifted down while the accelerator is turned on during the execution of the downshift associated with the accelerator being turned off. The torque-up step is a step of increasing the torque based on the operation of the electronic control throttle 13 of the engine 10 before the start of the inertia phase of the automatic transmission 30 and after the start of the inertia phase when the shift-down occurs in the accelerator-on state by the determination step. In the torque-up step, the first throttle torque request amount in the first period before the start of the inertia phase is made smaller than the second throttle torque request amount in the second period after the start of the inertia phase.

According to the above, the control device (ECU 100) of the vehicle 1 increases the second throttle torque requirement in the torque-up step of the electronic control throttle 13. Specifically, the control device (ECU 100) of the vehicle 1 increases the second throttle torque demand amount in the second step after the start of the inertia phase than the first throttle torque demand amount before the start of the inertia phase. Therefore, the control device can appropriately increase the torque by the first throttle torque request amount before the start of the inertia phase, and can shorten the shift time after the start of the inertia phase. Therefore, when the accelerator is turned on during the execution of the downshift, the control device can shorten the shift time and improve the operating comfort of the driver.

In addition, a retard angle for retarding the ignition timing of the engine 10 is generated in the first period, and the first throttle torque requirement is set based on the retard torque requirement associated with the retard angle of the engine 10. Accordingly, the vehicle 1 can set the first throttle torque requirement corresponding to the retard torque requirement of the engine 10, and can appropriately increase the torque of the electronic control throttle 13.

The first throttle torque request amount is set based on a misfire limit value at which the engine 10 in which the retard angle has occurred does not misfire due to the intake air amount of the electronic control throttle 13. Accordingly, the control device (ECU 100) can realize torque increase of the electronic control throttle 13 without causing misfire in the engine 10.

The first throttle torque request amount is a torque larger than the driver request torque at the accelerator-on of the driver. Accordingly, the control device (ECU 100) can stably increase the torque by the electronic control throttle 13 even when the accelerator operation amount of the driver is low.

Further, the retarded ignition timing of the engine 10 is returned with the start of the second period. Thus, the control device (ECU 100) can obtain a high-torque in the second time period in which the inertia phase is started.

The inertia phase is a state in which the engagement clutch side mainly transmits the rotational driving force in the downshift of the automatic transmission 30. In the torque-up step, the timing of switching the inertia phase is recognized based on the rotational speed of the shaft (turbine shaft 221) connected to the input shaft of the automatic transmission. Accordingly, the control device (ECU 100) can appropriately determine the starting timing of the inertia phase, and can smoothly switch the throttle torque request amount and the retard torque request amount.

Further, in the determination step, the torque-up step is performed when the accelerator is turned on before the start of the inertia phase, and the torque-up step is not performed when the accelerator is turned on after the start of the inertia phase. In this way, the control device (ECU 100) can simplify the control by not performing the torque-up step after the inertia phase is started.

Further, in the torque-up step, the second throttle torque requirement is lowered before the end of the inertia phase. Accordingly, the control device (ECU 100) can appropriately finish the torque-up process in accordance with the automatic transmission 30, and can smoothly re-accelerate the vehicle 1.

The control device (ECU 100) according to the embodiment disclosed herein is illustrative in all respects and is not restrictive. The embodiments can be modified and improved in various forms without departing from the scope and spirit of the appended claims. The matters described in the plurality of embodiments described above can be combined in other configurations as long as they are not inconsistent with each other, and can be combined as long as they are not inconsistent with each other.

What is claimed is:

1. A control device for a vehicle, for controlling a driving state of an engine and a shift stage of an automatic transmission, wherein:
    the control device controls
        a determination process of determining whether downshifting will occur in a state in which an accelerator is depressed, due to the accelerator being depressed during execution of downshifting in conjunction with the accelerator not being depressed, and
        a torque increasing process in which, when determination is made in the determination process that downshifting will occur in the state in which the accelerator is depressed, torque is increased based on operation of an electronic control throttle of the engine before starting of an inertia phase of the automatic transmission and after starting of the inertia phase; and
    in the torque increasing process, a first throttle torque request amount in a first period before starting of the inertia phase is set to be smaller than a second throttle torque request amount in a second period after starting of the inertia phase.

2. The control device according to claim 1, wherein:
    a retarded angle is generated to delay an ignition timing of the engine in the first period; and
    the first throttle torque request amount is set based on a retarded angle torque request amount in conjunction with the retarded angle of the engine.

3. The control device according to claim 2, wherein the first throttle torque request amount is set based on a misfire limit value at which the engine, in which the retarded angle is generated, does not misfire due to an intake amount of the electronic control throttle.

4. The control device according to claim 2, wherein the first throttle torque request amount is a torque that is greater than driver-requested torque that is requested by a driver depressing the accelerator.

5. The control device according to claim 2, wherein, in conjunction with start of the second period, the ignition timing of the engine that is retarded is returned.

6. The control device according to claim 1, wherein:
    the inertia phase is a state in which an engagement clutch side mainly transmits rotational driving force in downshifting of the automatic transmission; and
    in the torque increasing process, a switching timing of the inertia phase is recognized, based on a rotational speed of a shaft connected to an input shaft of the automatic transmission.

7. The control device according to claim 1, wherein, in the determination process, the torque increasing process is performed when the accelerator goes to a depressed state before starting of the inertia phase, and on the other hand the torque increasing process is not performed when the accelerator goes to a depressed state after starting of the inertia phase.

8. The control device according to claim 1, wherein, in the torque increasing process, the second throttle torque request amount is reduced before end of the inertia phase.

* * * * *